(12) United States Patent
Lee

(10) Patent No.: US 9,514,509 B2
(45) Date of Patent: Dec. 6, 2016

(54) ELECTRONIC DEVICE AND CONTROLLING METHOD

(71) Applicant: FIH (HONG KONG) LIMITED, Kowloon (HK)

(72) Inventor: Yen-Hsing Lee, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/688,836

(22) Filed: Apr. 16, 2015

(65) Prior Publication Data

US 2016/0132988 A1 May 12, 2016

(30) Foreign Application Priority Data

Nov. 6, 2014 (TW) .............................. 103138520 A

(51) Int. Cl.
| | | |
|---|---|---|
| *G06T 1/00* | (2006.01) | |
| *G06T 1/20* | (2006.01) | |
| *G06K 9/00* | (2006.01) | |
| *G01B 11/14* | (2006.01) | |

(52) U.S. Cl.
CPC ................. *G06T 1/20* (2013.01); *G01B 11/14* (2013.01); *G06K 9/00288* (2013.01)

(58) Field of Classification Search
CPC ................................. G06T 15/005; G06T 1/20
USPC ....................................................... 345/522
See application file for complete search history.

(56) References Cited

U.S. PATENT DOCUMENTS

| | | | | |
|---|---|---|---|---|
| 5,781,650 A | * | 7/1998 | Lobo ................... | G06K 9/00221 382/118 |
| 9,231,845 B1 | * | 1/2016 | Goldstein ................ | H04L 43/16 |
| 2009/0133051 A1 | * | 5/2009 | Hildreth ............... | H04N 5/4403 725/28 |
| 2009/0208056 A1 | * | 8/2009 | Corcoran ........... | G06K 9/00234 382/103 |
| 2010/0165140 A1 | * | 7/2010 | Steinberg ........... | G06K 9/00248 348/222.1 |
| 2011/0237324 A1 | * | 9/2011 | Clavin ............... | G06K 9/00369 463/29 |
| 2012/0050685 A1 | * | 3/2012 | Bartlett ................ | A61B 3/0033 351/223 |
| 2012/0257795 A1 | * | 10/2012 | Kim .................... | H04N 13/0022 382/106 |
| 2013/0029723 A1 | * | 1/2013 | Das .................... | H04M 1/72569 455/557 |
| 2013/0311001 A1 | * | 11/2013 | Hampiholi .............. | B60R 25/25 701/1 |
| 2015/0033309 A1 | * | 1/2015 | Fujiwara ................. | G06F 21/32 726/7 |

* cited by examiner

*Primary Examiner* — Devona Faulk
*Assistant Examiner* — Jin Ge
(74) *Attorney, Agent, or Firm* — Zhigang Ma

(57) ABSTRACT

A method for controlling operating time of an electronic device includes acquiring a facial image of a user, and a distance from the user to the electronic device. A facial zone from the facial image is recognized from the facial image, and a ratio is calculated between a size of the facial zone and a preset screen size of a display of the electronic device, and the distance between the user and the electronic device is acquired. When the user is determined not to be an adult based on analyses of the facial image and the acquired distance, the electronic device is turned off after a first determined duration.

15 Claims, 3 Drawing Sheets

ELECTRONIC DEVICE AND CONTROLLING METHOD

CROSS-REFERENCE TO RELATED APPLICATIONS

This application claims priority to Taiwanese Patent Application No. 103138520 filed on Nov. 6, 2014, the contents of which are incorporated by reference herein.

FIELD

The subject matter herein generally relates to controlling technology, and particularly to technology to control an electronic device.

BACKGROUND

An electronic device (e.g., a mobile phone or a personal digital assistant) can be used to browse a webpage or play games. Long time use can be harmful to eyes of a user, especially younger children.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
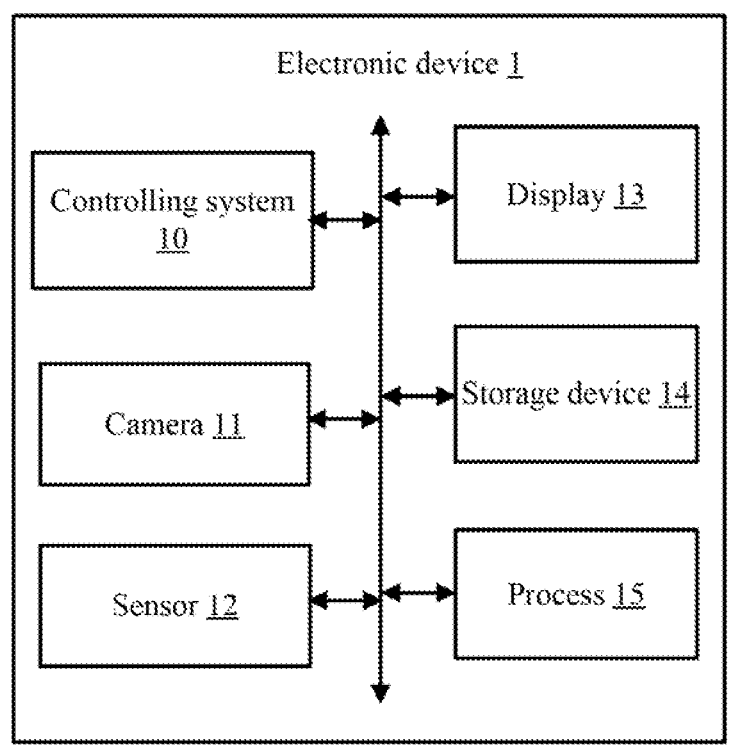
FIG. 1 is a block diagram of an example embodiment of an electronic device including a controlling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives.

FIG. 1 is a block diagram of an example embodiment of an electronic device including a controlling system. In at least one embodiment as shown in FIG. 1, an electronic device 1 includes a controlling system 10. The electronic device 1 can be a smart phone, a personal digital assistant (PDA), a tablet computer, or other electronic device. The electronic device 1 further includes, but is not limited to, a camera 11, a sensor 12, a display 13, a storage device 14, and at least one processor 15. FIG. 1 illustrates only one example of the electronic device, other examples can include more or fewer components than illustrated, or have a different configuration of the various components in other embodiments.

In at least one embodiment, the storage device 14 can include various types of non-transitory computer-readable storage mediums. For example, the storage device 14 can be an internal storage system, such as a flash memory, a random access memory (RAM) for temporary storage of information, and/or a read-only memory (ROM) for permanent storage of information. The storage device 14 can also be an external storage system, such as a hard disk, a storage card, or a data storage medium. The at least one processor 15 can be a central processing unit (CPU), a microprocessor, or other data processor chip that performs functions of the electronic device 1.

The controlling system 10 controls the camera 11 to acquire a facial image of a user of the electronic device 1, a distance between the user and the electronic device 1 is acquired, and the electronic device 1 determines if the user is an adult or not based on analyses of the facial image and the acquired distance.

Figure 2:
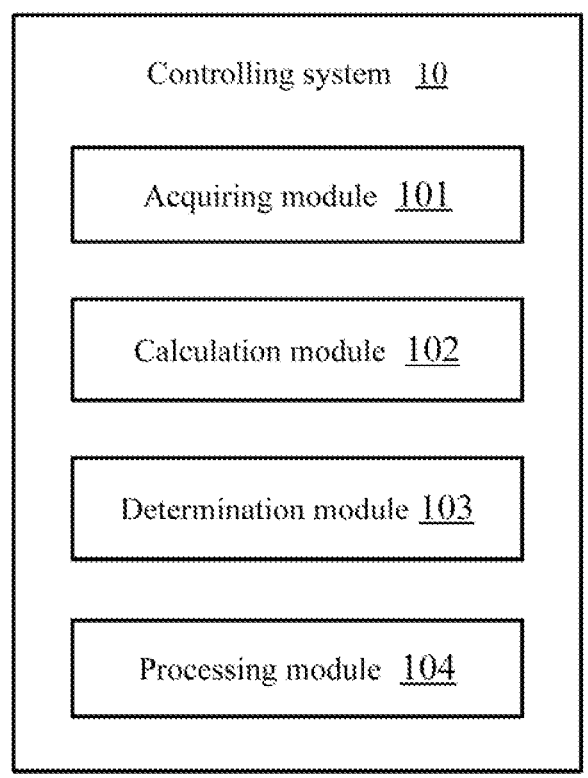
FIG. 2 is a block diagram of an example embodiment of function modules of the controlling system in the electronic device of FIG. 1.

FIG. 2 is a block diagram of one embodiment of function modules of the controlling system. In at least one embodiment, the controlling system 10 can include an acquiring module 101, a calculation module 102, a determination module 103, and a processing module 104. The function modules 101, 102, 103, and 104 can include computerized codes in the form of one or more programs which are stored in the storage device 14. The at least one processor 15 executes the computerized codes to provide functions of the function modules 101-104.

The acquiring module 101 activates the camera 11 to acquire a facial image of a user of the electronic device 1 when the electronic device 1 is activated. In some embodiments, the camera 11 is set to a first side of the electronic device 1, the camera 11 can capture the facial image of the user of the electronic device 1. In at least one embodiment, when the electronic device 1 is activated, the acquiring module 101 activates the camera 11, and acquires the facial image of the user of the electronic device 1 from the image captured by the camera 11.

The acquiring module 101 further designates a facial zone of the acquired facial image, and determines a size of the designated facial zone. In at least one embodiment, the acquiring module 101 designates the facial zone of the acquired facial image by using a human face recognition technology, and determines the size of the designated facial zone. In some embodiments, the facial image can be captured and acquired by invoking a background process that enables the camera 11.

The acquiring module 101 further acquires a distance between the user and the electronic device 1. In at least one embodiment, the distance between the user and the electronic device 1 can be determined by a sensor 12 or the camera 11. In some embodiments, when the camera 11 is focusing on the user to capture the facial image, the distance between the user and the electronic device 1 can be determined. In another embodiment, the sensor 12 can be a proximity sensor, the proximity sensor can emit a beam of electromagnetic radiation (e.g., infrared), and calculate a distance between the proximity sensor and an object after receiving the beam of electromagnetic radiation returning from the object.

The calculation module 102 calculates a ratio of the determined size of the designated facial zone and a preset screen size of a display 13 of the electronic device 1. In at least one embodiment, a display screen of the display 13 of the electronic device 1 having the preset screen size, the calculation module 102 detects the preset screen size of the display 13, and calculates the ratio between the determined size of the designated facial zone and the preset screen size of the display 13. The size of the facial zone and the preset screen size of the display 13 can be represented with pixels.

The determination module 103 determines whether the user is an adult based on the calculated ratio and the acquired distance. In some embodiments, the determination module 103 determines whether the user is an adult by searching a mapping table which is stored in the storage device 14 of the electronic device 1.

In at least one embodiment, the mapping table includes a plurality of distance ranges, and each of the plurality of distance ranges corresponds to a predetermined value and a duration. The duration can be used to control operating time of the user to use the electronic device 1. In some embodiments, as displays of different electronic devices have different screen sizes, the predetermined value can be different for different electronic devices.

The determination module 103 determines a distance range of the acquired distance by searching the mapping table, and determines the predetermined value corresponding to the determined distance range. When the calculated ratio is greater than or equal to the predetermined value (e.g., 60%) corresponding to the determined distance range, the user is determined to be an adult. When the calculated ratio is less than the predetermined value corresponding to the determined distance range, the user is determined to be a child.

When the user is determined to be the child, the determination module 103 further determines a first duration corresponding to the determined distance range by searching the mapping table, and then the processing module 104 deactivates the electronic device 1 after the first determined duration. When the user is determined not to be the child, the determination module 103 further determines a second duration corresponding to the determined distance range by searching the mapping table, and then the processing module 104 keeps the electronic device being activated for the second determined duration.

Figure 3:
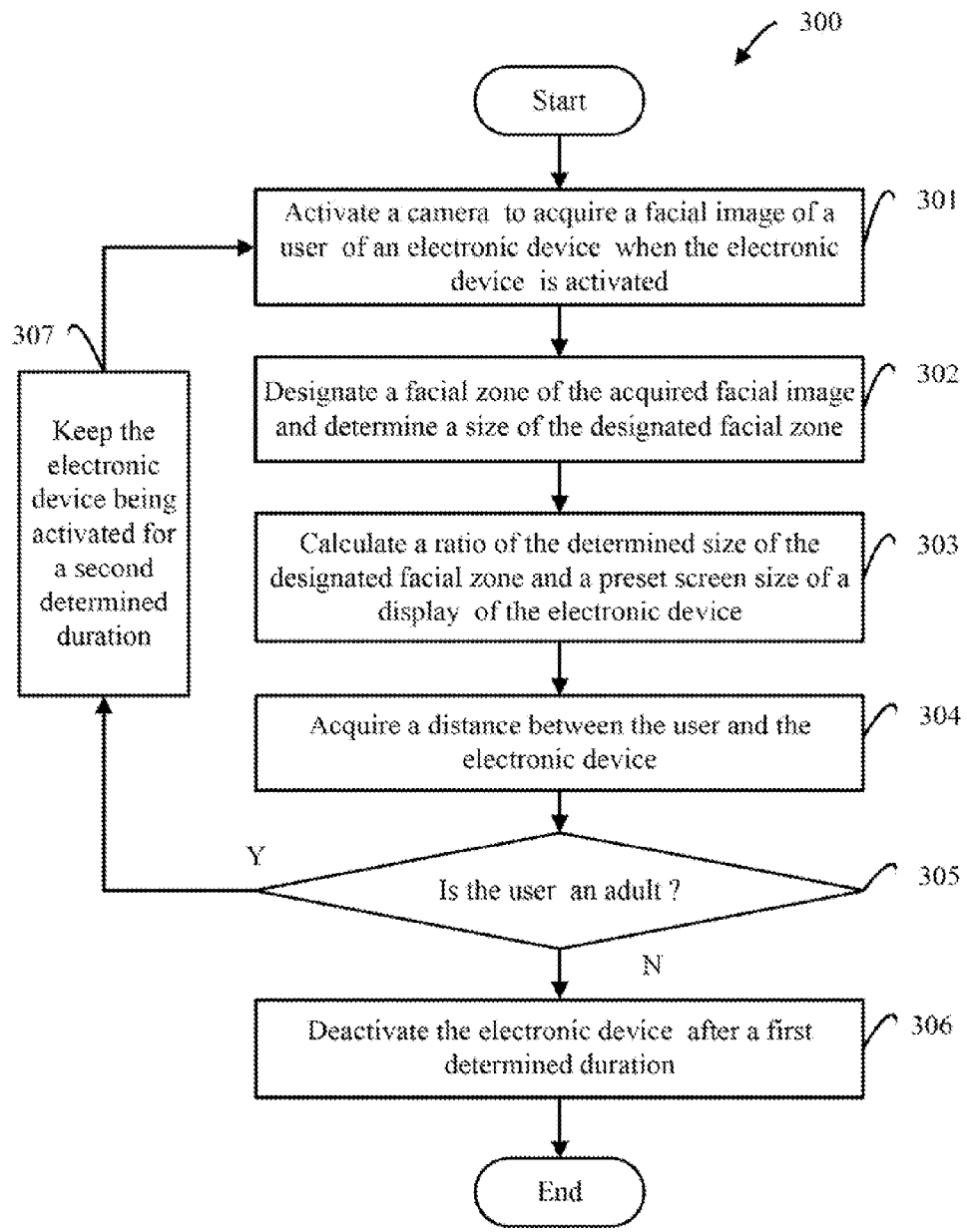
FIG. 3 is a flowchart of an example embodiment of a method for controlling operating time of the electronic device of FIG. 1.

FIG. 3 illustrates a flowchart is presented in accordance with an example embodiment. An example method 300 is provided by way of example, as there are a variety of ways to carry out the method. The example method 300 described below can be carried out using the configurations illustrated in FIG. 1 and FIG. 2, and various elements of these figures are referenced in explaining the example method. Each block shown in FIG. 3 represents one or more processes, methods, or subroutines, carried out in the example method 300. Furthermore, the illustrated order of blocks is illustrative only and the order of the blocks can be changed according to the present disclosure. The example method 300 can begin at block 301. Depending on the embodiment, additional blocks can be utilized and the ordering of the blocks can be changed.

At block 301, an acquiring module activates the camera 11 to acquire a facial image of a user of the electronic device 1 when the electronic device 1 is activated. In some embodiments, the camera 11 is set to a first side of the electronic device 1, the camera 11 can capture the facial image of the user of the electronic device 1. In at least one embodiment, when the electronic device 1 is activated, the acquiring module activates the camera 11, and acquires the facial image of the user of the electronic device 1 from the image captured by the camera 11.

At block 302, the acquiring module designates a facial zone of the acquired facial image, and determines a size of the designated facial zone. In at least one embodiment, the acquiring module further designates the facial zone of the acquired facial image by using a human face recognition technology, and determines the size of the designated facial zone. In some embodiments, the facial image can be captured and acquired by invoking a background process that enables the camera 11.

At block 303, a calculation module calculates a ratio of the determined size of the designated facial zone and a preset screen size of a display 13 of the electronic device 1. In at least one embodiment, the display screen of the display 13 of the electronic device 1 having the preset screen size, the calculation module detects the preset screen size of the display 13, and calculates the ratio between the determined size of the designated facial zone and a preset screen size of a display 13. The size of the facial zone and the preset screen size of the display 13 can be represented with pixels.

At block 304, the acquiring module acquires a distance between the user and the electronic device 1. In at least one embodiment, the distance between the user and the electronic device 1 can be determined by a sensor 12 or the camera 11. In some embodiments, when the camera 11 is focusing on the user to capture the facial image, the distance between the user and the electronic device 1 can be determined. In another embodiment, the sensor 12 can be a proximity sensor, the proximity sensor can emit a beam of electromagnetic radiation (e.g., infrared), and calculate a distance between the proximity sensor and an object after receiving the beam of electromagnetic radiation returning from the object.

At block 305, a determination module determines whether the user is an adult based on the calculated ratio and the acquired distance. When the user is determined not to be an adult, the procedure goes to block 306. When the user is determined to be an adult, the procedure goes to block 307. In some embodiments, the determination module determines whether the user is an adult according to the calculated ratio and the acquired distance by searching a mapping table which is stored in the storage device 14 of the electronic device 1.

In at least one embodiment, the mapping table includes a plurality of distance ranges, and each of the plurality of distance ranges corresponds to a predetermined value and a duration. The duration can be used to control operating time of the user to use the electronic device 1. In some embodiments, because displays of different electronic devices have different screen sizes, the predetermined value can be different for different electronic devices.

The determination module determines a distance range of the acquired distance by searching the mapping table, and determines the predetermined value corresponding to the determined distance range. When the calculated ratio is greater than or equal to the predetermined value corresponding to the determined distance range, the user is determined to be an adult. When the calculated ratio is less than the predetermined value corresponding to the determined distance range, the user is determined to be a child.

When the user is determined to be a child, at block 306, the determination module determines a first duration corresponding to the determined distance range by searching the mapping table, and a processing module deactivates the electronic device 1 after a first determined duration.

When the user is determined to be an adult, at block 307, the determination module determines a second duration corresponding to the determined distance range by searching the mapping table, and the processing module keeps the electronic device 1 being activated for a second determined duration, then, the procedure returns to block 301.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
a display screen having a preset screen size;
a camera;
at least one processor;
and a storage device storing a mapping table, which comprises a plurality of distance ranges, and each of the plurality of distance ranges corresponding to a predetermined value;
wherein, the storage device further stores one or more programs executable by the at least one processor; and
wherein, one or more of the programs stored in the storage device cause the processor to:
activate the camera to acquire a facial image of a user of the electronic device when the electronic device is activated to;
designate a facial zone of the acquired facial image;
determine a size of the designated facial zone;
acquire a distance from the user to the electronic device;
determine a distance range of the acquired distance by searching the mapping table;
calculate a ratio of the determined size of the designated facial zone and the preset screen size;
determine that the user is not an adult when the calculated ratio is less than the predetermined value corresponding to the determined distance range; and
deactivate the electronic device after a first determined duration when the user is determined not to be an adult.

2. The electronic device according to claim 1, wherein the at least one processor further:
determines that the user is an adult when the calculated ratio is greater than or equal to a predetermined value corresponding to the determined distance range; and
keeps the electronic device being activated for a second determined duration when the user is determined to be an adult.

3. The electronic device according to claim 2, wherein the mapping table further comprises a duration corresponding to each of the plurality of distance ranges.

4. The electronic device according to claim 3, wherein the determined duration corresponds to the determined distance range.

5. The electronic device according to claim 1, wherein the acquired distance is determined by a proximity sensor or the camera.

6. A computer-implemented method for controlling an electronic device being executed by at least one processor of the electronic device, the electronic device storing a mapping table, which comprises a plurality of distance ranges, and each of the plurality of distance ranges corresponding to a predetermined value, the method comprising:
activating a camera of the electronic device to acquire a facial image of a user of the electronic device when the electronic device is activated;
designating a facial zone of the acquired facial image;
determining a size of the designated facial zone;
acquiring a distance from the user to the electronic device;
determining a distance range of the acquired distance by searching the mapping table;
calculating a ratio of the determined size of the designated facial zone and a preset screen size of a display screen of the electronic device;
determining that the user is not an adult when the calculated ratio is less than the predetermined value corresponding to the determined distance range; and
deactivating the electronic device after a first determined duration when the user is determined not to be an adult.

7. The method according to claim 6, further comprising:
determining that the user is an adult when the calculated ratio is greater than or equal to a predetermined value corresponding to the determined distance range; and
keeping the electronic device being activated for a second determined duration when the user is determined to be an adult.

8. The method according to claim 7, wherein the mapping table further comprises a duration corresponding to each of the plurality of distance ranges.

9. The method according to claim 8, wherein the determined duration corresponds to the determined distance range.

10. The method according to claim 6, wherein the acquired distance is determined by a proximity sensor or the camera.

11. A non-transitory storage medium storing a mapping table, which comprises a plurality of distance ranges, each of the plurality of distance ranges corresponding to a predetermined value, and the non-transitory storage medium further having stored thereon instructions that, when executed by a processor of an electronic device, causes the processor to perform a controlling method using the electronic device, the method comprising:
activating a camera of the electronic device to acquire a facial image of a user of the electronic device when the electronic device is activated;
designating a facial zone of the acquired facial image;
determining a size of the designated facial zone;
acquiring a distance from the user to the electronic device;
determining a distance range of the acquired distance by searching the mapping table;

calculating a ratio of the determined size of the designated facial zone and a preset screen size of a display screen of the electronic device;

determining that the user is not an adult when the calculated ratio is less than the predetermined value corresponding to the determined distance range; and deactivating the electronic device after a first determined duration when the user is determined not to be an adult.

12. The non-transitory storage medium according to claim 11, wherein the method further comprises:

determining that the user is an adult when the calculated ratio is greater than or equal to a predetermined value corresponding to the determined distance range; and keeping the electronic device being activated for a second determined duration when the user is determined to be an adult.

13. The non-transitory storage medium according to claim 12, wherein the mapping table further comprises a duration corresponding to each of the plurality of distance ranges.

14. The non-transitory storage medium according to claim 13, wherein the determined duration corresponds to the determined distance range.

15. The non-transitory storage medium according to claim 11, wherein the acquired distance is determined by a proximity sensor or the camera.

* * * * *